United States Patent
Ohyama

(10) Patent No.: US 11,312,301 B2
(45) Date of Patent: Apr. 26, 2022

(54) DISPLAY APPARATUS, DISPLAY METHOD, AND PROGRAM

(71) Applicant: JVCKENWOOD CORPORATION, Yokohama (JP)

(72) Inventor: Minoru Ohyama, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/172,834

(22) Filed: Feb. 10, 2021

(65) Prior Publication Data
US 2021/0162924 A1 Jun. 3, 2021

Related U.S. Application Data

(63) Continuation of application No. PCT/JP2019/009440, filed on Mar. 8, 2019.

(30) Foreign Application Priority Data

Aug. 30, 2018 (JP) .............................. JP2018-161284

(51) Int. Cl.
*B60R 1/00* (2022.01)
*G06K 9/00* (2022.01)
(Continued)

(52) U.S. Cl.
CPC .............. *B60R 1/00* (2013.01); *G06T 11/203* (2013.01); *G06V 20/58* (2022.01); *H04N 9/3161* (2013.01);
(Continued)

(58) Field of Classification Search
CPC ................ B60R 1/00; B60R 2300/202; B60R 2300/205; B60R 2300/30; B60R 1/001;
(Continued)

(56) References Cited

U.S. PATENT DOCUMENTS

| | | | |
|---|---|---|---|
| 8,547,298 B2 | 10/2013 | Szczerba et al. | |
| 2004/0070551 A1* | 4/2004 | Walck ................... | G02B 27/01 345/7 |
| 2007/0279755 A1* | 12/2007 | Hitschmann ....... | G02B 27/0101 359/630 |

(Continued)

OTHER PUBLICATIONS

Sekisui Chemical Co., Ltd "Development of Interlayer film to meet the demands to increase the amount of Information displayed on a vehicle windshield" Dec. 8, 2015, [Retrieved on Jul. 4, 2018], Internet <URL: https://www.sekisui.co.jp/news/2015/1274415_23166.html> English translation provided (6 pages).

(Continued)

*Primary Examiner* — Nathnael Aynalem
(74) *Attorney, Agent, or Firm* — Procopio, Cory, Hargreaves & Savitch LLP

(57) ABSTRACT

A display apparatus projects an image of an object located in an area outside a mobile body onto a target projection surface, the target projection surface being set in a cabin of the mobile body and having a first region and a second region. The display apparatus includes: an image data acquisition unit that acquires image data; an image processing unit that generates projection image data by performing image conversion processing including color conversion in which the first wavelength light is selected for a pixel corresponding to the first region and the second wavelength light is selected for a pixel corresponding to the second region based on region distribution information; a light source unit that emits light selected from either the first wavelength light or the second wavelength light; and a projection unit that projects the image formed by the emitted light onto the target projection surface.

9 Claims, 15 Drawing Sheets

(51) Int. Cl.
  *G06T 11/20* (2006.01)
  *H04N 9/31* (2006.01)
  *G06V 20/58* (2022.01)
(52) U.S. Cl.
  CPC ...... *H04N 9/3182* (2013.01); *B60R 2300/205* (2013.01); *B60R 2300/30* (2013.01)
(58) Field of Classification Search
  CPC .......... G06K 9/00805; B60K 2370/334; B60K 2370/331; B60K 2370/332; B60K 2370/333; B60K 2370/21; B60K 2370/177; B60K 2370/176; B60K 2370/1529; B60K 2370/23; B60K 35/00; G06T 7/00
  USPC .......................................................... 348/148
  See application file for complete search history.

(56) References Cited

U.S. PATENT DOCUMENTS

| | | | |
|---|---|---|---|
| 2011/0073773 A1* | 3/2011 | Labrot | G02B 27/0018 250/461.1 |
| 2011/0317273 A1* | 12/2011 | Kasai | B60K 35/00 359/630 |
| 2014/0036075 A1* | 2/2014 | Kuhlman | G02B 5/30 348/148 |
| 2018/0024359 A1 | 1/2018 | Yoneyama | |

OTHER PUBLICATIONS

Xperia Touch (G1109) [Retrieved on Jul. 4, 2018], Internet <URL: https://www.sony.jp/xperia-smart-products/products/G1109/>; English description of Relevancy provided (11 pages).

* cited by examiner

DISPLAY APPARATUS, DISPLAY METHOD, AND PROGRAM

CROSS REFERENCE TO RELATED APPLICATION

The present application is a Bypass Continuation of PCT/JP2019/009440 filed on Mar. 8, 2019, which is based upon and claims the benefit of priority from Japanese Patent Application No. 2018-161284, filed on Aug. 30, 2018, the disclosure of which is incorporated herein in its entirety by reference.

BACKGROUND

The present disclosure relates to a display apparatus, a display method, and a program.

As display means for making a driver of an automobile visually recognize various information items, a display apparatus is provided in a region including the vicinity of a steering wheel as its center, such as a dashboard. In recent years, a Head-up Display (HUD) apparatus that projects a virtual image onto a part of a windshield has been widely used. In addition to the above, various other display techniques have been proposed.

For example, Non-Patent Literature 1 (Development of Interlayer film to meet the demands to increase the amount of Information displayed on a vehicle windshield [Retrieved on Jul. 4, 2018], Internet <URL: https://www.sekisui.co.jp/news/2015/1274415_23166.html>) discloses the development of an interlayer film to meet the demands to increase the amount of information displayed on glass of an automobile. Further, Non-Patent Literature 2 (Xperia Touch (G1109) [Retrieved on Jul. 4, 2018], Internet <URL: https://www.sony.jp/xperia-smart-products/products/G1109/>) discloses a technique for projecting an image on various places.

SUMMARY

In order to recognize information from the display apparatus disposed on the dashboard, the driver of the automobile needs to take his or her eyes off the view outside the automobile during driving. It is not, however, desired that the driver perform the aforementioned act of taking his/her eyes off the view outside the automobile during driving, because it may reduce the safety of driving. In this connection, a HUD apparatus displays an image on the windshield, whereby it is possible to reduce the number of times the driver moves his/her eyes. However, the display range of the HUD apparatus is limited, and there are restrictions on the use of the HUD apparatus as means for providing information to the driver. Therefore, there is a demand for a technique for suitably displaying information within a viewing angle of the driver so that he/she does not have to take his/her eyes off the view outside the automobile during driving.

According to an embodiment, a display apparatus is a display apparatus configured to project an image of an object located in an area outside a mobile body onto a target projection surface, the target projection surface being set in a cabin of the mobile body and having a first region in which a first wavelength light is reflected and a second region in which the first wavelength light is transmitted and in which visible light is emitted by receiving a second wavelength light that is different from the first wavelength light. The display apparatus includes: an image data acquisition unit configured to acquire image data which is data of the image; an image processing unit configured to, based on region distribution information which is information about a distribution of the first and the second regions, generate projection image data by performing, on the image data, image conversion processing including color conversion in which the first wavelength light is selected for a pixel corresponding to the first region and the second wavelength light is selected for a pixel corresponding to the second region; a light source unit configured to emit light selected from either the first wavelength light or the second wavelength light; and a projection unit configured to project the image formed by the emitted light onto the target projection surface.

According to an embodiment, a display method is a display method for projecting an image of an object located in an area outside a mobile body onto a target projection surface, the target projection surface being set in a cabin of the mobile body and having a first region in which a first wavelength light is reflected and a second region in which the first wavelength light is transmitted and in which visible light is emitted by receiving a second wavelength light that is different from the first wavelength light. The display method includes: an image data acquisition step of acquiring image data which is data of the image; an image conversion step of, based on region distribution information which is information about a distribution of the first and the second regions, generating projection image data by performing, on the image data, image conversion processing including color conversion in which the first wavelength light is selected for a pixel corresponding to the first region and the second wavelength light is selected for a pixel corresponding to the second region; an emission step of emitting light selected from either the first wavelength light or the second wavelength light; and a projection step of projecting the image formed by the emitted light onto the target projection surface.

According to the present embodiment, it is possible to provide a display apparatus and a warning system that enable a passenger to suitably recognize an object located in an area outside a mobile body.

DETAILED DESCRIPTION

Embodiments according to the present disclosure will be described hereinafter with reference to the drawings. In order to clarify the explanation, the following descriptions and the drawings are partially omitted and simplified as appropriate. Note that throughout the drawings, the same components are denoted by the same reference signs and redundant descriptions are omitted as appropriate.

First Embodiment

Figure 1:
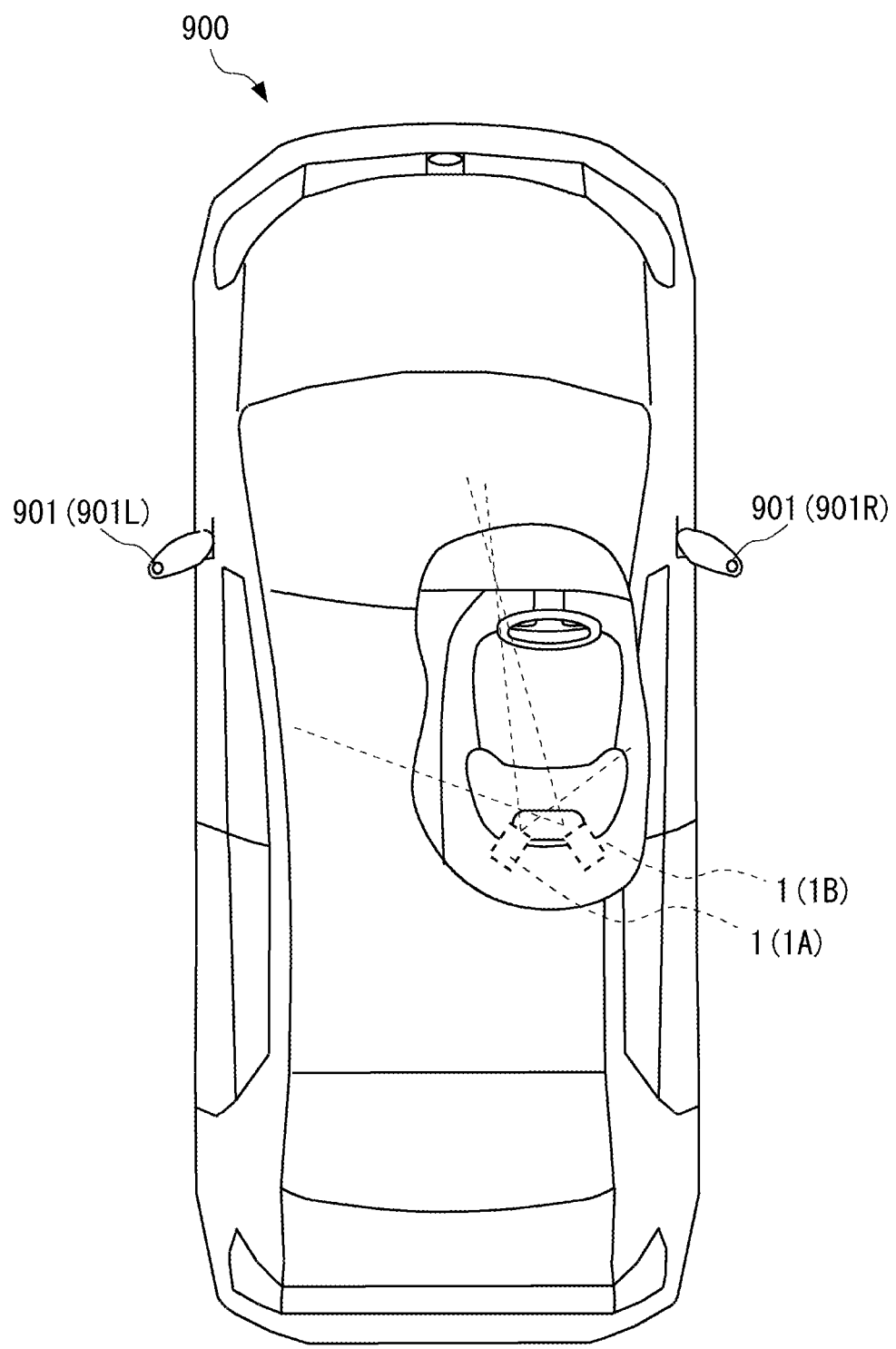
FIG. 1 is a top view of an automobile equipped with a display apparatus according to an embodiment.

A first embodiment will be described with reference to FIG. 1. FIG. 1 is a top view of an automobile equipped with a display apparatus according to the embodiment. An automobile 900 shown in FIG. 1 includes cameras 901 and a display apparatus 1. The cameras 901 are a plurality of cameras, each of which shoots an image of the area outside the automobile 900. As shown in FIG. 1, the automobile 900 includes a camera 901R on the right door mirror thereof and a camera 901L on the left door mirror thereof. The camera 901R shoots an image of the area outside the right side of the automobile 900, and the camera 901L shoots an image of the area outside the left side of the automobile 900. Specifically, the camera 901R shoots the area in the direction to the right rear of the automobile 900 from the right side thereof and the camera 901L shoots the area in the direction to the left rear of the automobile 900 from the left side thereof. Further, the cameras 901 may include a camera which is disposed so that it faces in the direction to the front of the automobile 900 in order to shoot the area in the direction to the front of the automobile 900. Further, the cameras 901 may include a camera which is disposed so that it faces in the direction to the rear of the automobile 900 in order to shoot the area in the direction to the rear of the automobile 900.

The display apparatus 1 is a laser projector that displays a predetermined image by projecting a laser light onto a target projection region set in a cabin of the automobile 900. As shown in FIG. 1, the automobile 900 includes two display apparatuses (a display apparatus 1A and a display apparatus 1B). The display apparatuses 1A and 1B are fixed to a ceiling of the automobile 900 above the driver's seat, and are set so that the display apparatus 1A projects an image onto a region of the cabin on the right front side thereof, and the display apparatus 1B projects an image onto a region of the cabin on the left front side thereof. The display apparatus 1A, for example, performs predetermined processing on an image of the area outside the right side of the automobile 900 shot by the camera 901R and then projects this image toward the right front of the cabin. Similarly, the display apparatus 1B, for example, performs predetermined processing on an image of the area outside the left side of the automobile 900 shot by the camera 901L and then projects this image toward the left front of the cabin.

Figure 2:
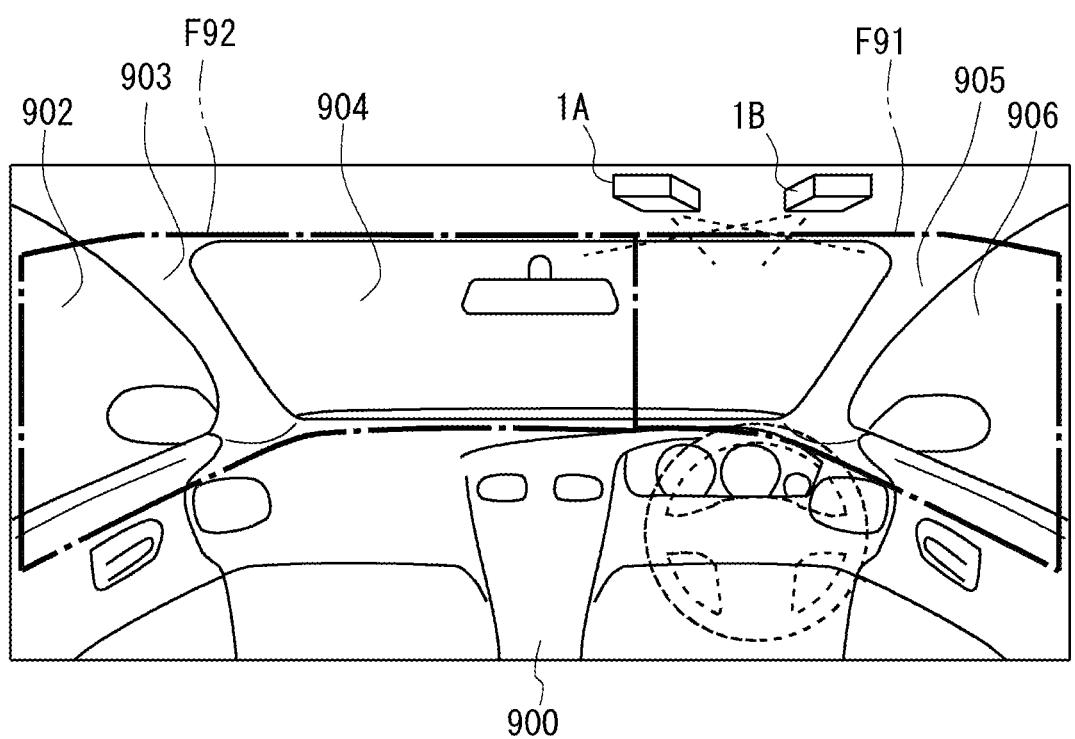
FIG. 2 is a diagram showing a target projection region of the display apparatus according to an embodiment.

A target projection region in the cabin of the automobile 900 will be described with reference to FIG. 2. FIG. 2 is a diagram showing the target projection region of the display apparatus according to the first embodiment. In a region assumed to be the visual field of the driver in the front side of the cabin of the automobile 900, a target projection region F91 is set on the right side of the cabin of the automobile 900 and a target projection region F92 is set on the left side thereof so that it is adjacent to the projection region F91.

The target projection region F91 is a region onto which the display apparatus 1A projects an image. The target projection region F91 includes a windshield 904, a right A-pillar 905, a side window 906, a dashboard, a front right door trim, and the like. Further, the target projection region F92 is a region onto which the display apparatus 1B projects an image. The target projection region F92 includes the windshield 904, a left A-pillar 903, a side window 902, the dashboard, a front left door trim, and the like. That is, the target projection regions F91 and F92 include regions (the A-Pillars, the dashboard, and the like) in which visible light is not easily transmitted, and regions (the side windows and the windshield) in which visible light is easily transmitted. In the following description, the region in which visible light is not easily transmitted is referred to as a first region. Further, the region in which visible light is easily transmitted is referred to as a second region. The left end part of the projection region F91 and the right end part of the projection region F92 may partially overlap each other or a space may be provided therebetween.

The A-pillar 905, the dashboard, and the like, which form the first region of the regions forming the target projection region, are regions in which visible light is not transmitted. The first region has a function of reflecting visible light without transmitting visible light. Thus, in the first region, visible light projected by the display apparatus 1 is reflected, whereby it is possible for a driver or the like to visually recognize the reflected visible light. The surface of the first region may be formed of a material including a retroreflective material so that visible light projected by the display apparatus 1 can be suitably reflected.

The side window 902, the windshield 904, and the side window 906, which form the second region of the regions forming the target projection region, each have a function of transmitting visible light, and emitting light when it receives ultraviolet light having a predetermined wavelength. A material having such a function is, for example, laminated glass having a self-luminous intermediate film.

Figure 3:
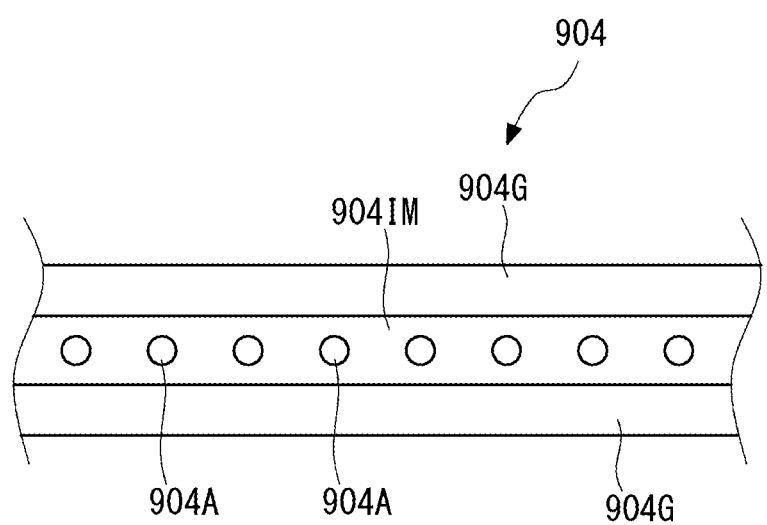
FIG. 3 is a cross-sectional view of a windshield according to a first embodiment.

An overview of the principle of a self-luminous intermediate film will be described with reference to FIG. 3, which illustrates the windshield 904. FIG. 3 is a cross-sectional view of the windshield according to the first embodiment. The windshield 904 is composed of two glass plates 904G and a self-luminous intermediate film 904IM sandwiched between the two glass plates 904G. Further, the self-luminous intermediate film 904IM contains a luminescent material 904A. The luminescent material 904A has a property of emitting fluorescent light having a wavelength in a visible light range when it is excited by ultraviolet light having a specific wavelength and transmitting light other than the ultraviolet light. That is, the display apparatus 1 projects a predetermined ultraviolet light onto the windshield 904 having the above-described structure, whereby the self-luminous intermediate film 904IM emits light. Thus, a driver or the like riding in the automobile 900 can visually recognize an image displayed on the windshield 904.

Note that the side window 902, the windshield 904, and the side window 906 are not limited to being formed of the materials described above, and may instead each have any other structure having a function of transmitting visible light and emitting light when it receives ultraviolet light having a predetermined wavelength. For example, the side window 902, the windshield 904, and the side window 906 may be formed of a combination of a resin such as acrylic, which transmits visible light, and a luminescent material. Further, in addition to the structure described above, the side window 902, the windshield 904, and the side window 906 may have UV-cut layers having a property of cutting ultraviolet light on an outer surface side of the automobile. By this structure, it is possible to prevent ultraviolet light projected by the display apparatus 1 from leaking to the outside and prevent the entire surface of each of the side window 902, the windshield 904, and the side window 906 from being fluoresced by ultraviolet light contained in sunlight and hence obstructing the visual field of the driver.

As described above, the target projection regions F91 and F92 have the first region in which visible light is reflected and the second region in which visible light is transmitted and fluorescence light having the wavelength range of visible light is emitted by receiving ultraviolet light.

Figure 4:
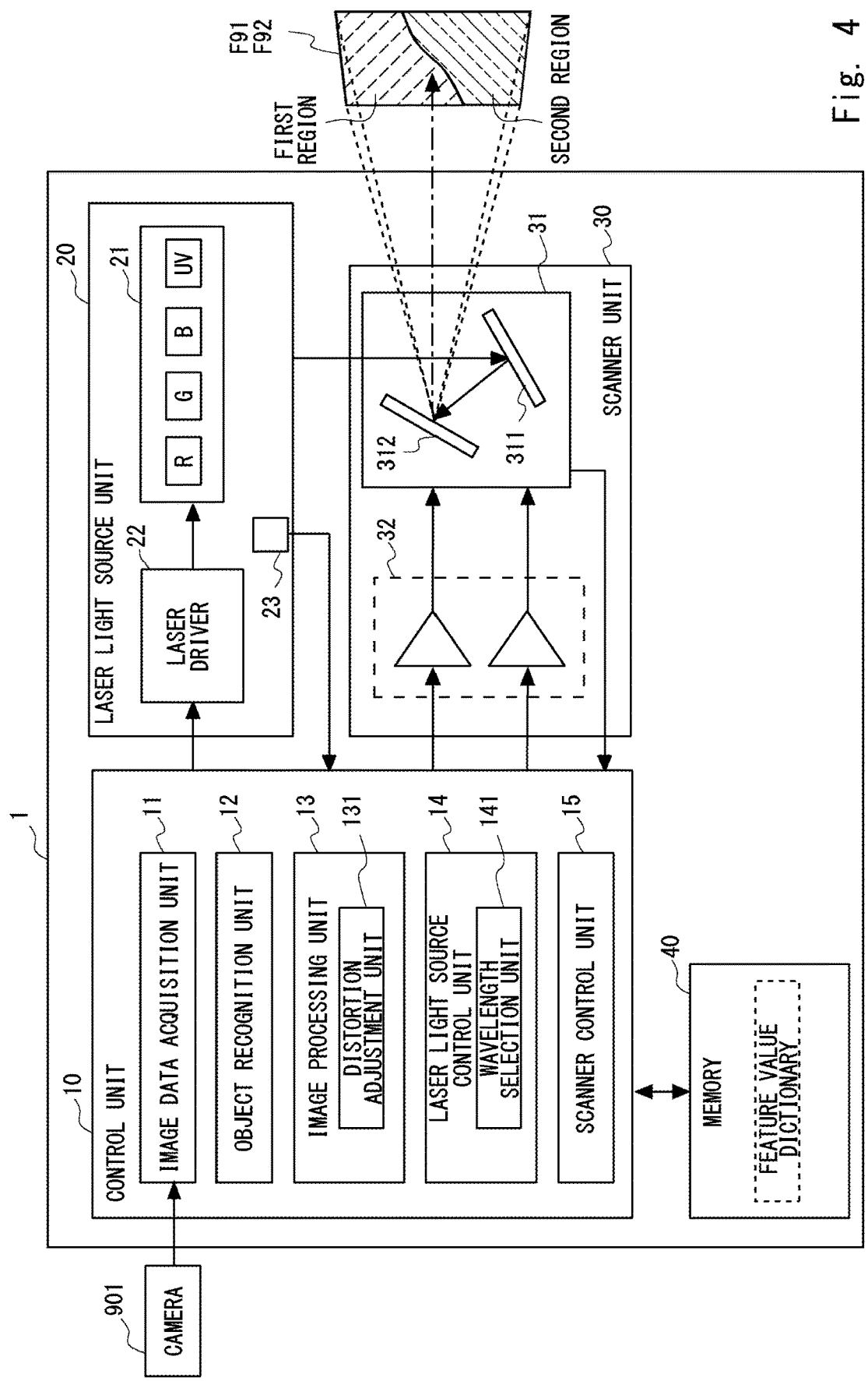
FIG. 4 is a block diagram of a display apparatus according to the first embodiment.

Next, the configuration of the display apparatus 1 will be described with reference to FIG. 4. FIG. 4 is a block diagram of the display apparatus according to the first embodiment. The display apparatus 1 includes, as its main components, a control unit 10, a laser light source unit 20, a scanner unit 30, and a memory 40.

The control unit 10 is connected to the camera 901, the laser light source unit 20, the scanner unit 30, and the memory 40, and thereby controls the operation of the display apparatus 1. The control unit 10 is composed of, for example, a Central Processing Unit (CPU), a Graphics Processing Unit (GPU), or a combination of other electric circuits. Therefore, for example, the control unit 10 may be referred to as a control circuit. The control unit 10 includes, as its main components, an image data acquisition unit 11, an image processing unit 13, an object recognition unit 12, a laser light source control unit 14, and a scanner control unit 15.

The image data acquisition unit 11 receives image data, which is data of an image of the area outside the automobile 900 shot by the camera 901, via a predetermined interface.

The object recognition unit 12 recognizes an object, which is a target to be recognized from the image data acquired by the image data acquisition unit 11. In order to perform recognition processing, the object recognition unit 12, for example, extracts a feature value from luminance data of the image data, and checks whether the extracted feature value coincides with a feature value dictionary stored in the memory 40. Further, when the object recognition unit 12 detects the object to be recognized, it temporarily holds information about the recognized object, such as the position, the size, and the type thereof. Alternatively, the object recognition unit 12 supplies information about the recognized object, such as the position, the size, and the type thereof, to the image processing unit 13.

The image processing unit 13 performs, based on the image data acquired by the image data acquisition unit 11 and the information about the object received from the object recognition unit 12, predetermined processing on the image data. An example of the predetermined processing is processing for extracting image data of the target object recognized by the object recognition unit 12 and generating projection image data for projecting the extracted image data onto the target projection regions F91 and F92. Note that the projection image data is image data of an image projected by the display apparatus 1. Another example of the predetermined processing is processing for, on image data, superimposing a frame around the recognized target object, or superimposing an icon or character information for displaying a type of the recognized object, such as whether the recognized object is a pedestrian or a bicycle. When the above processing is performed, the image processing unit 13 reads image data stored in advance in the memory 40 and superimposes the read image data on the image data.

Further, the image processing unit 13 includes a distortion adjustment unit 131. The distortion adjustment unit 131 performs distortion adjustment processing suitable for a target projection surface on the image data. The distortion adjustment processing includes linear correction such as trapezoidal correction, and nonlinear correction. By performing this processing, the display apparatus 1 can project an image having little distortion onto a projection surface. Note that how the distortion adjustment method, which is a method for adjusting image data, is executed is determined by a position where the display apparatus 1 is disposed and a shape of the target projection region, and the specific processing is executed, for example, by using a conversion formula stored in advance in the memory 40. The image processing unit 13 performs the above-described processing, thereby generating projection image data.

The laser light source control unit 14 outputs a laser drive signal based on the projection image data to a laser driver 22, thereby controlling the output of a laser diode. By doing so, the laser light source control unit 14 controls the output of light from the laser light source unit 20. Specifically, the laser light source control unit 14 controls driving of red, blue, and green laser diodes 211R, 211B, and 211G, respectively, and an ultraviolet laser diode 211UV in accordance with the color and the brightness of each pixel included in the projection image data processed by the image processing unit 13. Further, the laser light source control unit 14 performs Auto Power Control (APC) processing. In the APC processing, the laser light source control unit 14 evaluates the state of the laser light source unit 20 based on the intensity of the laser light detected by a photodiode 23, determines the driving current values of the laser diodes 211, and controls the laser driver 22.

Further, the laser light source control unit 14 operates in synchronization with the scanner control unit 15. More specifically, the laser light source control unit 14, for example, shares a horizontal synchronization signal for synchronization in the horizontal direction and a vertical synchronization signal for synchronization in the vertical direction with the scanner control unit 15, and determines the output of each laser based on these signals. As described above, the laser light source control unit 14 and the scanner control unit 15 operate in synchronization with each other, whereby the display apparatus 1 controls the color and the output of each pixel that constitutes the projection image data. Thus, the display apparatus 1 can generate a desired image.

Further, the laser light source control unit 14 includes a wavelength selection unit 141. The wavelength selection unit 141 has a function of selecting, for the first region, visible light corresponding to the first region as a first wavelength light, and selecting, for the second region, ultraviolet light corresponding to the second region as a second wavelength light based on region distribution information which is information about a distribution of the first and the second regions on the target projection surface. Note that details of the region distribution information will be described later.

The wavelength selection unit 141 performs, for example, processing for setting an output of visible light or ultraviolet light for each pixel of an image projected by the display apparatus 1. The laser light source control unit 14 switches the output of visible light or ultraviolet light by outputting the laser light set by the wavelength selection unit 141 based on the horizontal and the vertical synchronization signals. By this configuration, the display apparatus 1 drives a visible light laser when it projects pixels included in the first region, while the display apparatus 1 drives an ultraviolet laser when it projects pixels included in the second region. Thus, by switching laser lights based on preset region distribution information, it is possible to efficiently perform a wavelength switching operation.

Note that the wavelength selection unit 141 may include region distribution information as a rewritable register. By making the region distribution information rewritable, it is possible to easily cope with a change in the region distribution information of the target projection region.

The scanner control unit 15 outputs a scanner drive signal to a scanner driver 32 and controls scanning of a laser light performed by a scanner 31. The scanner control unit 15 operates based on the above-described horizontal and vertical synchronization signals. Further, the scanner control unit 15 monitors a detection signal of a scan angle detection unit (not shown) that detects a scan angle of the scanner 31 and performs, for example, control of the scan angle, the waveform generation, and the oscillation frequency of the scanner 31.

The laser light source unit 20 includes a laser module 21 that outputs a laser light, the laser driver 22 that drives laser diodes included in the laser module 21, the photodiode 23 that measures the amount of laser light, and the like.

Figure 5:
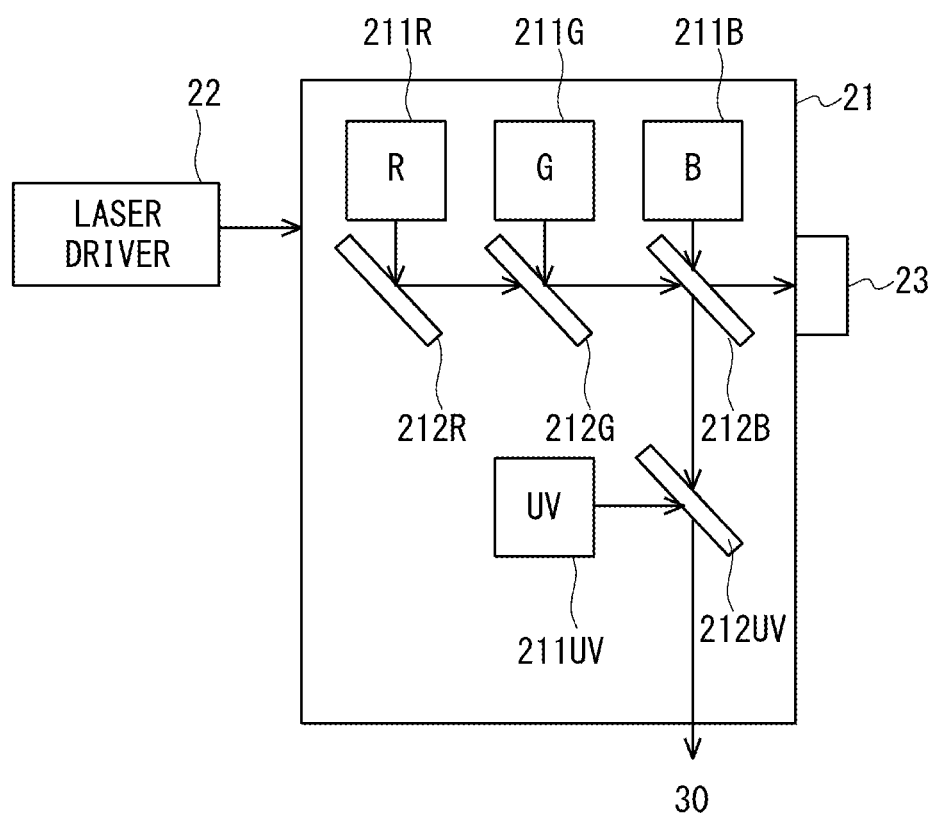
FIG. 5 is a block diagram of a light source unit of the display apparatus according to the first embodiment.

Details of the laser light source unit 20 will be described with reference to FIG. 5. FIG. 5 is a block diagram of the light source unit of the display apparatus according to the first embodiment. As shown in FIG. 5, the laser module 21 includes the red laser diode 211R, the green laser diode 211G, the blue laser diode 211B, the ultraviolet laser diode 211UV, and dichroic mirrors 212R, 212G, 212B, and 212UV corresponding to the laser diodes 211R, 211B, 211G, and 211UV, respectively. The laser lights of the respective colors output from the laser diodes 211 are multiplexed by the dichroic mirrors 212, and then output to the scanner unit 30.

The dichroic mirror 212R has a characteristic of reflecting approximately 100% of the light having a red wavelength output from the red laser diode 211R. The dichroic mirror 212G has a characteristic of transmitting approximately 100% of the light having a red wavelength output from the red laser diode 211R and reflecting approximately 100% of the light having a green wavelength output from the green laser diode 211G. Examples of characteristics of the dichroic mirror 212B include a characteristic of reflecting about 98% of the light having a red wavelength output from the red laser diode 211R and about 98% of the light having a green wavelength output from the green laser diode 211G, and transmitting about 2% of each of these lights. Further, the examples of characteristics of the dichroic mirror 212B includes a characteristic of transmitting about 98% of the light having a blue wavelength output from the blue laser diode 211B and reflecting about 2% of this light. The dichroic mirror 212UV has a characteristic of transmitting approximately 100% of the lights having a red wavelength and a green wavelength reflected by the dichroic mirror 212B and approximately 100% of the light having a blue wavelength transmitted through the dichroic mirror 212B, and reflecting approximately 100% of the ultraviolet light output from the ultraviolet laser diode 211UV.

By this configuration of the dichroic mirror 212, about 98% of each of the visible lights (the laser light having a red wavelength, the laser light having a green wavelength, and the laser light having a blue wavelength) output from the laser diodes 211 is made incident on the scanner unit 30, and about 2% of each of the visible lights is made incident on the photodiode 23. Further, about 100% of the ultraviolet light output from the laser diode 211 is made incident on the scanner unit 30. The laser driver 22 drives the laser diodes 211 based on a laser drive signal from the control unit 10. The photodiode 23 measures the amount of incident laser light and outputs a result of the measurement to the control unit 10. Note that the configurations of the laser diodes 211 and the dichroic mirrors 212 are not limited to those shown in FIG. 5, and any configuration can be adopted as long as the respective outputs from these diodes and mirrors to the scanner unit 30 and the photodiode 23 are performed in a manner similar to those performed by the laser diodes 211 and the dichroic mirrors 212 according to the configurations shown in FIG. 5.

Referring back to FIG. 4, the description will be continued. The scanner unit 30 projects a laser light made incident from the laser light source unit 20 as an image onto the target projection region. The scanner unit 30 can also be referred to as a projection unit. The scanner unit 30 includes, as its main components, the scanner 31, which is a scanning mirror unit that reflects the laser light output from the laser light source unit 20 and scans it, the scanner driver 32 that drives the scanner 31, a scan angle detection unit (not shown) that detects a scan angle of the scanner 31, and the like. The scanner 31 includes a vertical mirror 311 that reflects a laser light and scans it in a vertical direction, a horizontal mirror 312 that reflects a laser light and scans it in a horizontal direction, and the like. The vertical mirror 311 and the horizontal mirror 312 are configured by a micro electro mechanical system (MEMS) mirror and the like.

The scanner driver 32 drives the scanner 31 based on a scanner drive signal from the scanner control unit 15. When the scanner 31 is configured by the vertical mirror 311 and the horizontal mirror 312, in general, the vertical mirror 311 operates at a scan angle and an oscillation frequency controlled by the scanner driver 32, and the horizontal mirror 312 operates at a scan angle and a oscillation frequency due to resonance since the oscillation frequency is high. Note that the horizontal mirror 312, like the vertical mirror 311, may operate at the scan angle and the oscillation frequency controlled by the scanner driver 32.

The memory 40 is a non-volatile storage device. The memory 40 is connected to the control unit 10. The control unit 10 can write any data into the memory 40 or read any data stored in the memory 40. Further, the memory 40 stores a recognition dictionary.

Figure 6:
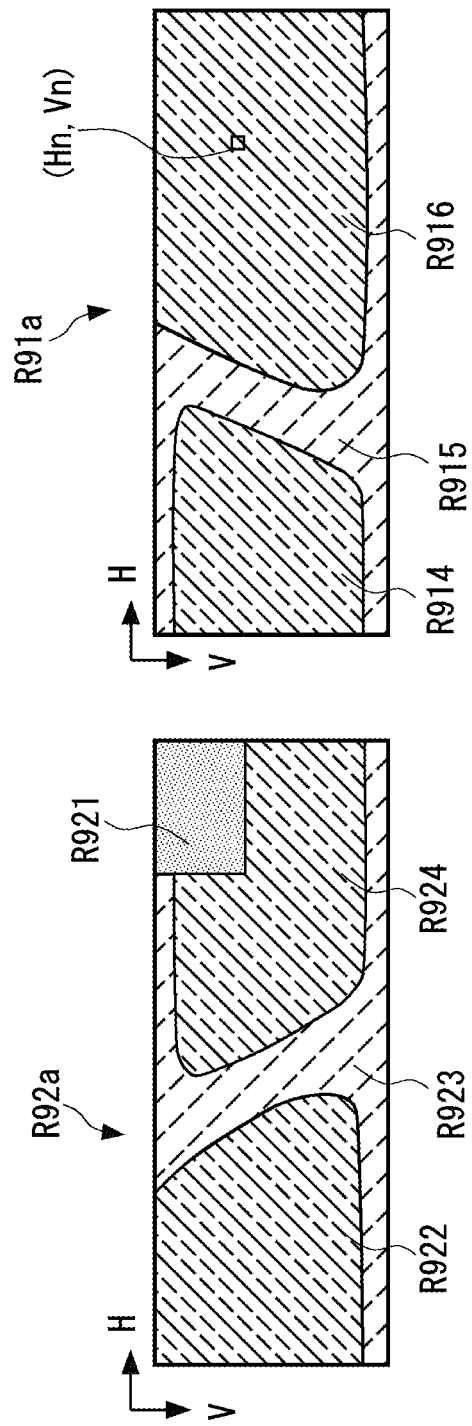
FIG. 6 is a diagram showing region distribution information of the display apparatus according to the first embodiment.

Next, region distribution information will be described with reference to FIGS. 6 and 7. FIG. 6 is a diagram showing region distribution information of the display apparatus according to the first embodiment. A rectangular figure on the right side of FIG. 6 schematically shows region distribution information R91a of the display apparatus 1A.

The region distribution information R91a is formed so that the projection region of the display apparatus 1A corresponds to the target projection region F91 shown in FIG. 2. That is, in the region distribution information R91a, a region corresponding to the windshield 904 included in the target projection region F91 is a region R914. Similarly, in the region distribution information R91a, the A-pillar 905 and the like correspond to a region R915, and the side window 906 corresponds to a region R916. That is, the region R915 is the first region in which visible light is reflected, and hatching of the same type as that of the first region shown in FIG. 4 is applied thereto. Further, the regions R914 and R916 are the second regions which emit light in response to ultraviolet light, and hatching of the same type as that of the second region shown in FIG. 4.

The region distribution information R91a corresponds to a position of each pixel of image data. For example, in the region distribution information R91a, a region corresponding to each pixel is defined for each position of each of the pixels in a horizontal direction H and a vertical direction V using the upper left of the rectangle as the origin. For example, an address of any pixel of an image in the horizontal direction and an address of any pixel of an image in the vertical directions are defined as Hn and Vn, respectively, the image being projected by the display apparatus 1A. In this case, the region distribution information R91a shown in FIG. 6 indicates whether the pixel of the address (Hn, Vn) is the first region or the second region.

A rectangular figure on the left side of FIG. 6 schematically shows region distribution information R92a of the display apparatus 1B. The region distribution information R92a is formed on a principle similar to that of the above-described region distribution information R91a. That is, the region distribution information R92a includes a region R923 as the first region, and a region R922 and a region R924 as the second regions. However, the region distribution information R92a differs from the region distribution information R91a described above in that the region distribution information R92a includes a region R921. The region R921 is a region of a rearview mirror disposed in the windshield 904. That is, the display apparatus 1 is configured so that it does not project an image onto the region of the rearview mirror. Therefore, the region R921 is formed so that a laser light is not projected thereonto. As described above, in region distribution information, a region onto which light is not projected may be set in advance.

Next, region distribution information will be further described with reference to FIG. 7. FIG. 7 shows region distribution information including distortion adjustment information. A rectangular figure on the right side of FIG. 7 schematically shows region distribution information R91 of the display apparatus 1A.

As shown in the figure, unlike the region distribution information R91a shown in FIG. 6, the first and the second regions have a bent band shape in which the shape of the outer edge gently increases from the left end thereof toward the right end thereof and gently descends toward the right end thereof using the region R915 as the vertex. Further, the rectangular region distribution information R91 includes blank regions R910, each of which is not hatched so as to correspond to its shape, in the upper right, the upper left, and the lower center thereof, respectively.

The blank region R910 is a region onto which a laser light is not projected. This shape of the projection region is due to the relative positional relation between the position where the display apparatus 1A is disposed and the target projection region F91. That is, the region distribution information R91 includes information about distortion adjustment corresponding to the target projection region F91.

Figure 7:
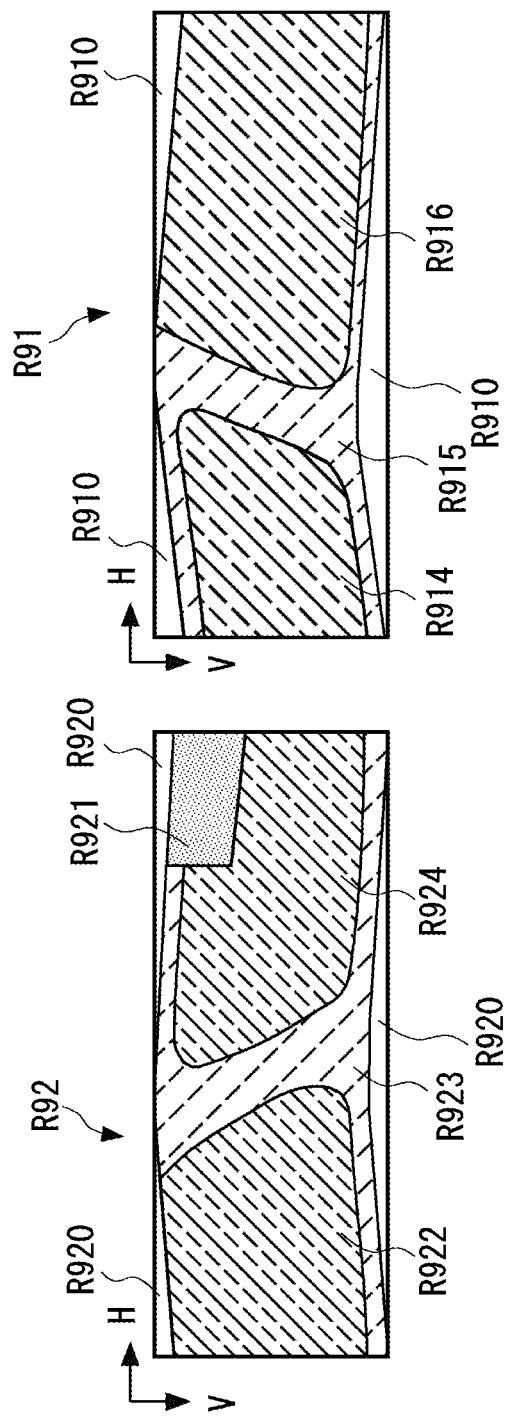
FIG. 7 shows region distribution information including distortion adjustment information.

A rectangular figure on the left side of FIG. 7 schematically shows region distribution information R92 of the display apparatus 1B. As shown in in the figure, in the distribution information R92, unlike the region distribution information R92a shown in FIG. 6, the first and the second regions have a bent band shape in which the shape of the outer edge gently increases from the left end thereof toward the right thereof and gently descends toward the right end thereof using the region R923 as the vertex. Further, the rectangular region distribution information R92 includes blank regions R920, each of which is not hatched so as to correspond to its shape, in the upper right, the upper left, and the lower center thereof, respectively. The region distribution information R92 is formed on a principle similar to that of the above-described region distribution information R91. That is, the region distribution information R92 includes distortion adjustment information in addition to the region distribution information R91a shown in FIG. 6.

The wavelength selection unit 141 supplies a switching signal of laser lights to the laser light source unit 20 based on the region distribution information configured as described above. By doing so, the display apparatus 1 can efficiently project a suitable image in which distortion is reduced onto the target projection region F91. Note that a technique of adjusting distortion by making image data projected by a projector correspond to the distance to the target projection region is known to a person skilled in the art, and therefore a detailed description thereof will be omitted here.

Figure 8:
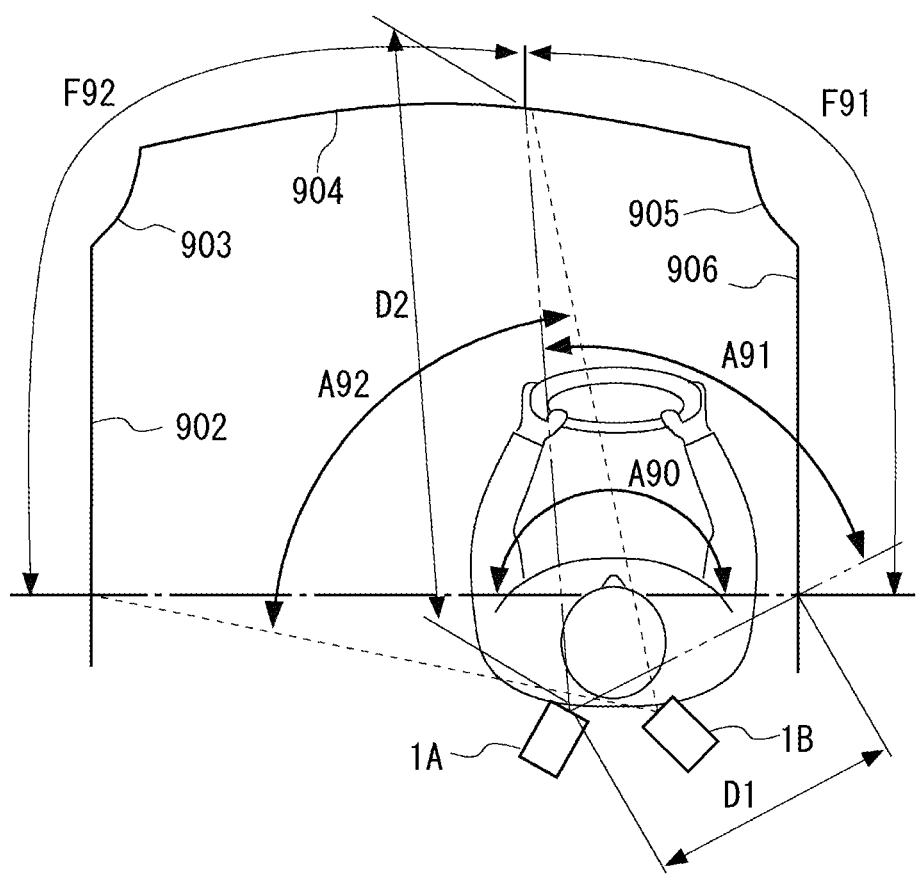
FIG. 8 is a diagram showing a projection range of the display apparatus according to the first embodiment as viewed from the top thereof.

Next, a relation between a projection range of the display apparatus and the visual field of a user will be described with reference to FIG. 8. FIG. 8 is a diagram showing the projection range of the display apparatus according to the first embodiment as viewed from the top thereof. As shown in FIG. 8, the target projection region F91 includes the windshield 904, the A-pillar 905, and the side window 906. The target projection region F92 includes the windshield 904, the A-pillar 903, and the side window 902.

As shown in FIG. 8, the display apparatuses 1A and 1B are disposed above and behind the driver so that they perform projection in directions different from each other. The display apparatus 1A is disposed above and behind the driver on the left side and performs projection to the right front side of the driver. The display apparatus 1A has a projection angle A91. That is, the display apparatus 1A is disposed so that the target projection region F91 is included in a range of the projection angle A91. Similarly, the display apparatus 1B has a projection angle A92. The display apparatus 1B is disposed so that the target projection region F92 is included in a range of the projection angle A92. As shown in FIG. 8, the target projection regions F91 and F92 are adjacent to each other. Further, a region obtained by combining the target projection regions F91 and F92 substantially coincides with a visual field A90 of the driver.

In this way, by disposing the display apparatus 1 above and behind the driver, it is possible to increase the projection region of the display apparatus 1, and accordingly, it is possible to increase the target projection region. Further, by disposing the display apparatus 1 in the above-described manner, the display apparatus 1 can display an image over the entire range of the visual field of the driver. Therefore, the display apparatus 1 can perform display with a high degree of freedom. Further, by disposing the display apparatus 1 above the driver and at a position corresponding to the position of the driver's eye, the display apparatus 1 can easily display an image close to an image viewed from the viewpoint of the driver. Note that in a state where a plurality of display apparatuses 1 are disposed and their projection ranges are made adjacent to each other, by tiling images to be projected by the plurality of display apparatuses 1, the display apparatus 1 can suitably display a wide-angle image.

Note that as shown in FIG. 8, when display is performed over the entire range of the visual field of the driver in the cabin of the automobile 900, the distance from the display apparatus 1 to the target projection region greatly varies. For example, a distance D1 from the display apparatus 1A to the right end of the target projection region F91 that corresponds to the display apparatus 1A is not more than half a distance D2 from the display apparatus 1A to the left end of the target projection region F91 that corresponds to the display apparatus 1A. When the distances (the projection distances) from the display apparatus to the target projection region widely differ from each other as described above, a focus-free laser projector that displays images by sequentially scanning coherent lights can be suitably used.

Figure 9:
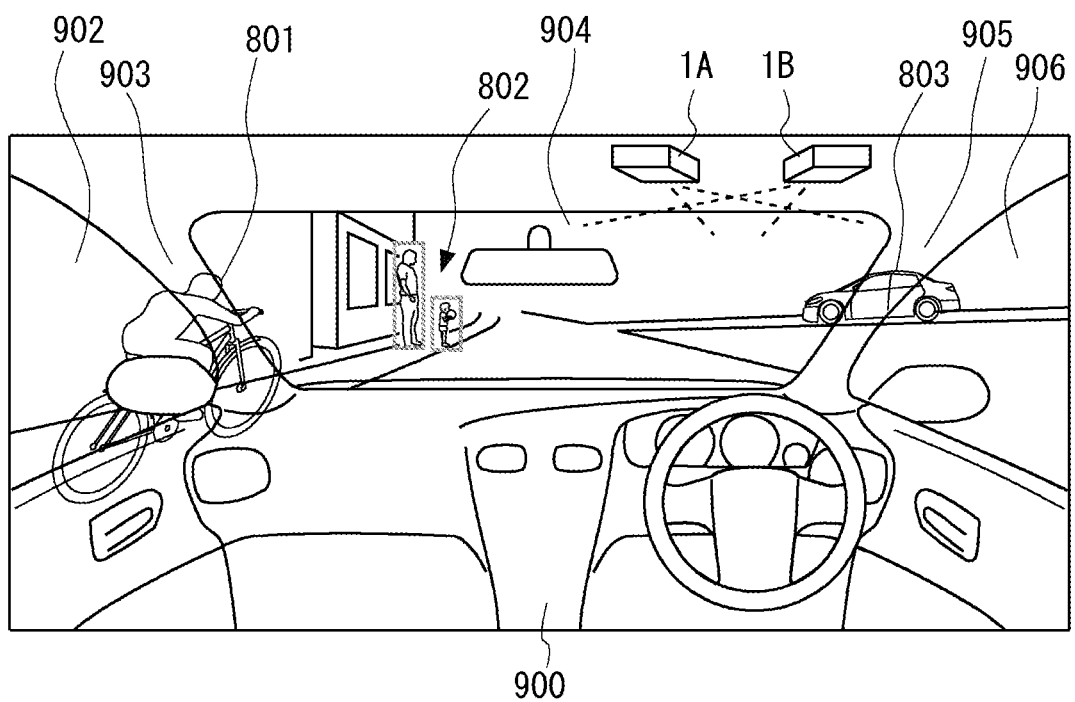
FIG. 9 shows an example in which an image is projected by the display apparatus according to the first embodiment.

Next, an example of display performed by the display apparatus 1 will be described with reference to FIG. 9. FIG. 9 shows an example in which an image is projected by the display apparatus according to the first embodiment. FIG. 9 shows scenery that a driver of the automobile 900 is looking at. In the following description of this embodiment, such scenery that the driver is looking at is also referred to as scenery viewed from a viewpoint of the driver. As shown in FIG. 9, a bicycle 801 is traveling to the left front of the automobile 900. Further, in the traveling direction of the automobile 900, there is a pedestrian 802. Further, to the right front of the automobile 900, another automobile 803 is traveling on a side road. Further, the display apparatus 1 can recognize the aforementioned objects from image data of images shot by the cameras 901 disposed outside the automobile 900. In the above situation, a display example in which display performed by the display apparatus 1 differs for each object will be described.

First, a first display example is described using the other automobile 803. The display apparatus 1 displays, based on the images shot by the cameras 901, the other automobile 803 that is hidden from view due to the right A-pillar. Here, the other automobile 803 can be visually recognized through the windshield 904, over the A-pillar 905, and through the side window 906. In such a case, the display apparatus 1 does not display the other automobile 803 on the second region that can be directly, visually recognized through the glass, but can only display it on the first region corresponding to the A-pillar 905 which is a blind spot of the driver. By performing such display, the display apparatus 1 can suitably display an object located in the blind spot. Further, the display apparatus 1 displays the other automobile 803 so that a displayed image is superimposed on the scenery viewed from the viewpoint of the driver without giving a feeling that something is wrong. That is, the display apparatus 1 performs distortion adjustment so that the image of the other automobile 803 projected onto the A-pillar 905 becomes the image viewed from the viewpoint of the driver. Then, the display apparatus 1 displays the image of the other automobile 803 on the A-pillar 905 so that it does not deviate from the other automobile 803 visually recognized by the driver with the naked eye through the windshield 904 and the side window 906. By doing the above, the driver can intuitively recognize the position and the size of the object.

Next, a second display example will be described using the pedestrian 802. The display apparatus 1 recognizes the pedestrian 802 present in front of the automobile 900 based on the images shot by the cameras. In order for the driver to recognize the presence of the pedestrian 802, the display apparatus 1 performs display in which the area around the pedestrian 802 is surrounded by a polygonal frame such as a rectangle. In this case, the display apparatus 1 displays a rectangle by projecting ultraviolet light onto the second region. Note that when the pedestrian 802 is present at the same position as that of the first region, the display apparatus 1 performs display by projecting visible light onto the first region. As described above, the display apparatus 1 can perform the above display in order for the driver to recognize the recognized object within the range of the visual field of the driver regardless of whether the recognized object is in the first region or the second region. Therefore, the display apparatus 1 can perform display for making the driver recognize the object so that he/she can intuitively recognize it. Note that the display in which the area around the object is surrounded by a frame in order to make the driver recognize the object is, as a matter of course, merely one example of a method for making the driver recognize the object, and the display apparatus 1 can employ various methods for achieving the same using images, characters, and the like.

Next, a third display example will be described using the bicycle 801. The display apparatus 1 recognizes the bicycle 801 traveling to the left front of the automobile 900 based on the images shot by the cameras. Further, the display apparatus 1 displays the bicycle 801 so that it can be visually recognized through the side window 902, over the A-pillar 903, through the windshield 904, and the like. In this case, since the bicycle 801 is located behind the A-pillar 903 and the left side mirror, most of the bicycle 801 cannot be visually recognized with the naked eye from the visual field of the driver. In such a situation, the display apparatus 1 can display, on the side window 902, the bicycle 801 located behind the left side mirror. Note that, here, like in the first display example, the display apparatus 1 displays the bicycle 801 as an image viewed from the viewpoint of the driver.

Note that the display apparatus 1 can extract image data of the object recognized by the object recognition unit 12, and properly display the extracted projection image data related to the object in accordance with the display examples described above. That is, the display apparatus 1 can extract a part of the image data generated by the camera 901 and display the extracted image, instead of using all of the image data generated by the camera 901 as a projection image. Thus, the display apparatus 1 can efficiently perform desired display while preventing the display from being complicated.

Modified Example 1 of First Embodiment

Figure 10:
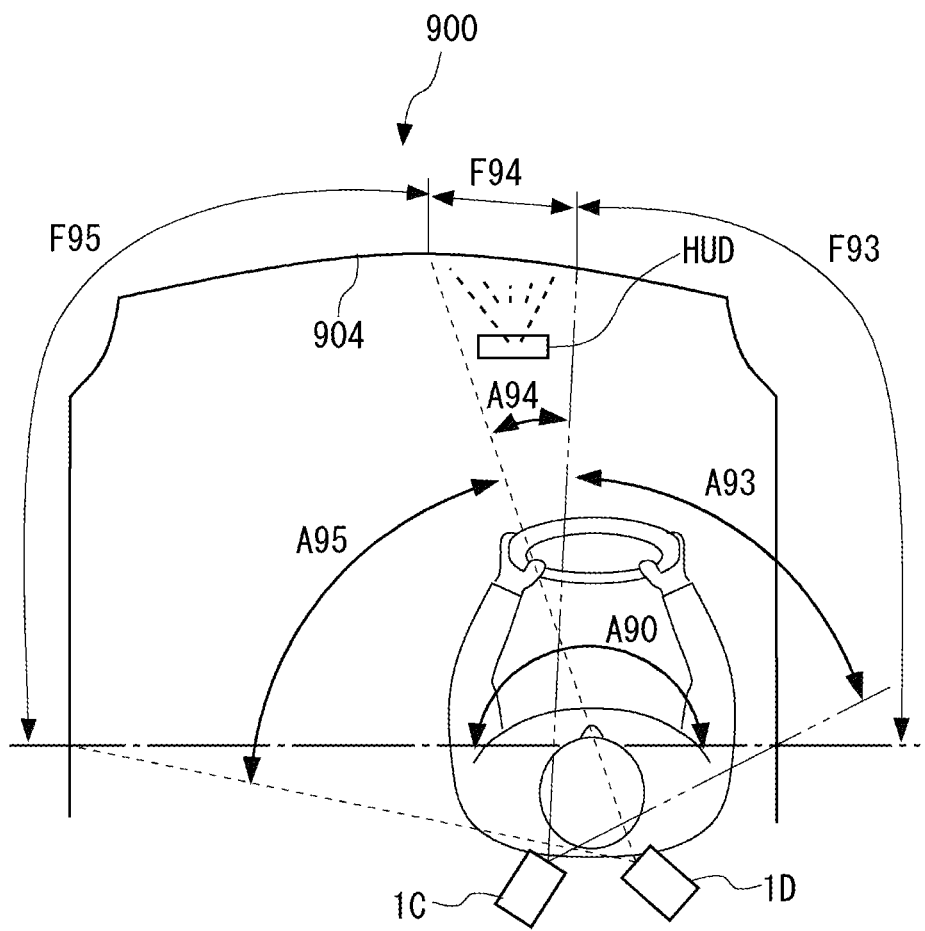
FIG. 10 is a diagram showing a projection range of a display apparatus according to a modified example 1 of the first embodiment as viewed from the top thereof.

Next, a modified example 1 of the first embodiment will be described with reference to FIG. 10. FIG. 10 is a diagram showing a projection range of a display apparatus according to a modified example 1 of the first embodiment as viewed from the top thereof. The projection range of the display apparatus 1 according to this modified example differs from that of the first embodiment.

As shown in FIG. 10, the automobile 900 includes a display apparatus 1C and a display apparatus 1D behind the driver. The display apparatuses 1C and 1D, respectively, have the same configurations as those of the display apparatuses 1A and 1B, but the projection angles are narrower than those of the respective display apparatuses 1A and 1B. That is, the display apparatus 1C has a projection angle A93, and accordingly corresponds to a target projection region F93. The display apparatus 1D has a projection angle A95, and accordingly corresponds to a target projection region F95. Further, the target projection region F93 is not adjacent to the target projection region F95. Further, a target projection region F94 in which a head-up display apparatus HUD performs display is provided between the target projection regions F93 and F95. Here, the target projection regions F93 and F94 are adjacent to each other, and the target projection regions F94 and F95 are adjacent to each other. That is, in the modified example of first embodiment, the target projection regions F93, F94, and F95 are connected to each other, thereby covering the visual field A90 of the driver. By such a configuration, the display apparatuses 1C and 1D can perform display with a high degree of freedom with regard to the visual field of the driver by cooperating with the head-up display apparatus HUD.

Further, the display apparatus 1 according to this modified example can cooperate with the head-up display apparatus HUD, to thereby perform display using a change in a feeling of depth with regard to the driver. That is, when a real image is provided to the driver, the display apparatus 1C or 1D projects ultraviolet light onto the windshield 904. Further, when a virtual image having a feeling of depth is provided to the driver, the head-up display apparatus HUD displays the image. By this configuration, the display apparatus 1 can perform display with a high degree of freedom. Note that in the modified example of the first embodiment, the target projection regions F93 and F94 or the target projection regions F94 and F95 may overlap each other.

Modified Example 2 of First Embodiment

Next, a modified example 2 of the first embodiment will be described with reference to FIG. 11. This modified example differs from the above-described first embodiment in that region distribution information is stored in the memory. Further, this modified example differs from the above-described first embodiment in that the wavelength selection unit 141 operates based on the region distribution information stored in the memory 40.

Figure 11:
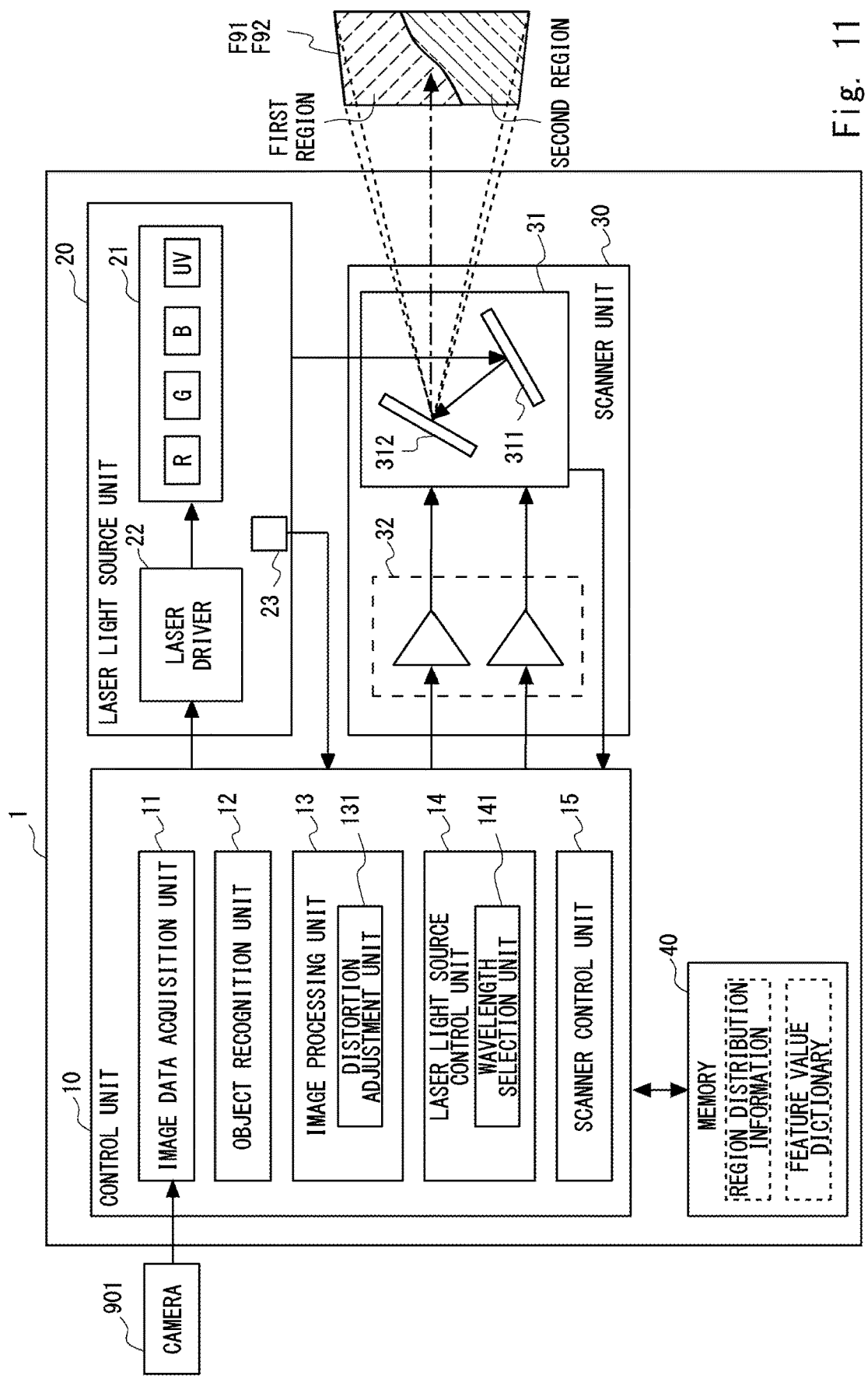
FIG. 11 is a block diagram of a display apparatus according to a modified example 2 of the first embodiment.

FIG. 11 is a block diagram of the display apparatus according to the modified example 2 of first embodiment. The differences between the display apparatus according to this modified example and that of the first embodiment will be described below. The wavelength selection unit 141 is implemented by, for example, a register set based on region distribution information stored in the memory 40. When the laser light source control unit 14 controls a laser light in synchronization with the scanner control unit 15, the laser light source control unit 14 selects a wavelength of the laser based on the setting of the wavelength selection unit 141. By this configuration, the display apparatus 1 drives a visible light laser when it projects pixels included in the first region, while the display apparatus 1 drives an ultraviolet laser when it projects pixels included in the second region. Thus, by switching laser lights based on preset region distribution information, it is possible to efficiently perform a wavelength switching operation.

The memory 40 according to this modified example stores region distribution information. The memory 40 is a rewritable non-volatile storage device such as an Erasable Programmable Read Only Memory (EPROM), a flash memory, or a Ferroelectric Random Access Memory (FeRAM). Further, the region distribution information stored in the memory 40 can be rewritten by a user. By the above configuration, the display apparatus according to the modified example 2 of the first embodiment can easily update region distribution information and suitably display information within the viewing angle of the driver.

The first embodiment has been described above. However, the configurations of the display apparatus 1 are not limited to those described above. For example, instead of a MEMS mirror, the scanner unit may be a reflective liquid crystal panel or a Digital Light Processing (DLP) type projector. In this case, for example, the display apparatus 1 may include a reflective panel for each wavelength of light to be projected and may be configured to composite images generated for each wavelength of light and project the composited images to the outside. Further, the display apparatus 1 may output, to a reflective panel that reflects a plurality of lights of wavelengths different from each other, lights of different wavelengths in a time-division manner. Note that, as a matter of course, visible light projected to the first region may be of any one color or two or more colors.

Further, the display apparatus 1 may display not only an image viewed from the viewpoint of the driver but also an image viewed from the viewpoint of a passenger other than the driver. In this case, the display apparatus 1 may change the image to be displayed to an image viewed from the viewpoint of any passenger who is seated.

By the above configuration, according to the first embodiment, it is possible to provide a display apparatus capable of suitably displaying information within the viewing angle of the driver or the like based on region distribution information.

Second Embodiment

Figure 12:
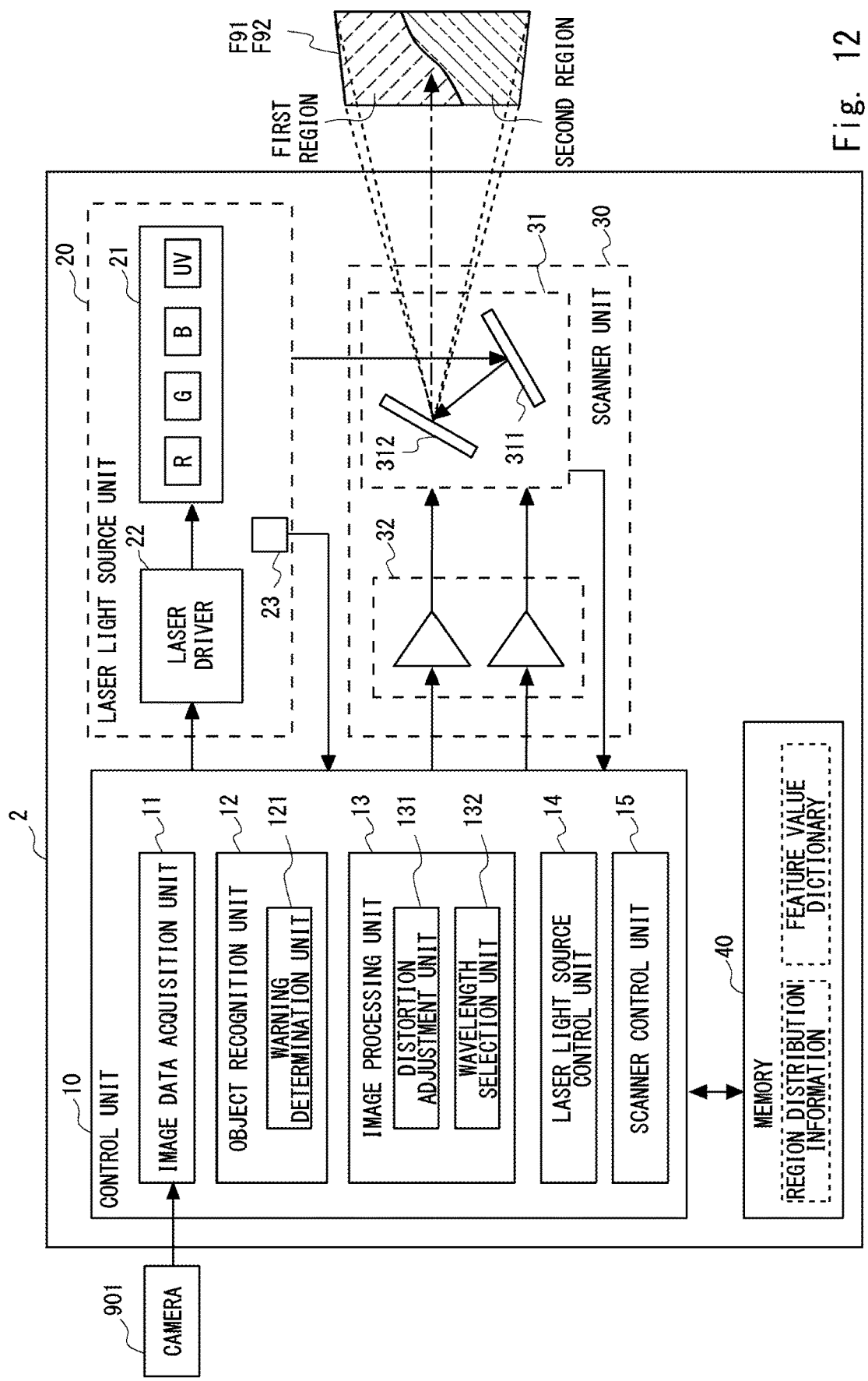
FIG. 12 is a block diagram of a display apparatus according to a second embodiment.

Next, a second embodiment will be described with reference to FIG. 12. FIG. 12 is a block diagram of a display apparatus according to the second embodiment. A display apparatus 2 according to the second embodiment differs from the first embodiment described above in that the object recognition unit 12 includes a warning determination unit 121 and that the wavelength selection unit is included in the image processing unit 13 in place of the laser light source control unit 14.

The object recognition unit 12 includes the warning determination unit 121. More specifically, the warning determination unit 121 determines whether or not an object recognized by the object recognition unit 12 may come into contact with the automobile 900, and when it determines that the object recognized by the object recognition unit 12 may come into contact with the automobile 900, the warning determination unit 121 determines to display a warning for this object.

The image processing unit 13 includes a wavelength selection unit 132. The wavelength selection unit 132 performs conversion processing of the color and the output of the image to be projected based on region distribution information. For example, in image data, position information of a pixel is defined by the H (horizontal) and V (vertical) address. Further, information about the color in a predetermined pixel of the image data is defined for each of R (red), G (green), and B (blue) in 256 stages from 0 to 255. The wavelength selection unit 132 converts, based on a preset condition, the pixel information defined as described above so that it is defined by R, G, B, and UV (ultraviolet light) and their respective output values.

For example, the wavelength selection unit 132 first checks the position information of the pixel (hereinafter referred to as a target pixel) to be processed against the region distribution information stored in the memory 40 and determines whether the target pixel is included in the first region or the second region. When the wavelength selection unit 132 determines that the target pixel is included in the first region, it maintains the information about the color and the output of the target pixel. On the other hand, when the wavelength selection unit 132 determines that the target pixel is included in the second region, it converts the information about the color and the output of the target pixel based on a preset method. More specifically, for example, the wavelength selection unit 132 calculates an average of the output values of R, G, and B, and uses the calculated output value as an output value of ultraviolet light. Note that when the output value of UV is determined, it may be based on the maximum output values of R, G and B, or may be based on a quantified value obtained by quantifying the visibility of each color.

Figure 13:
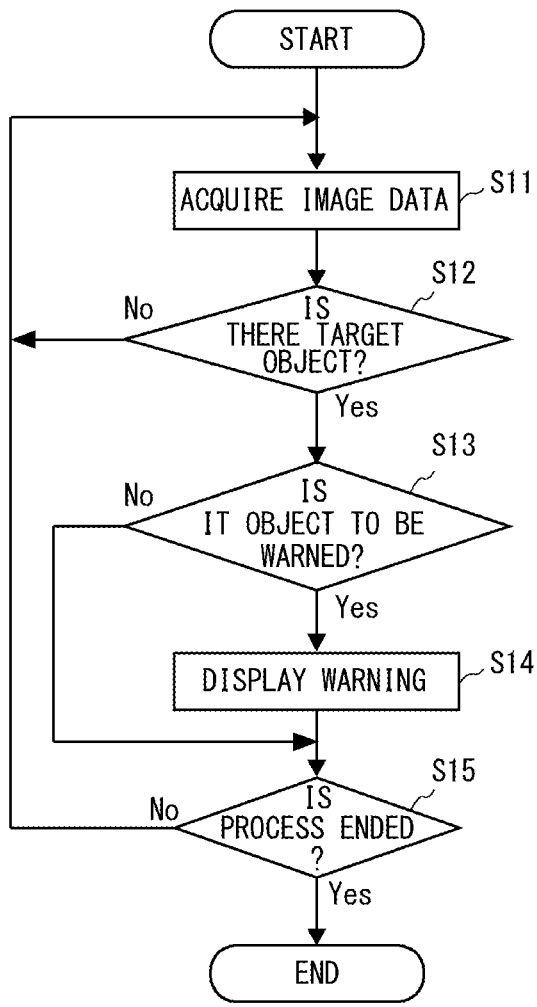
FIG. 13 is a flowchart showing processing of the display apparatus according to the second embodiment.

Next, processing performed by the display apparatus 2 according to the second embodiment will be described with reference to FIG. 13. FIG. 13 is a flowchart showing processing of the display apparatus according to the second embodiment. The flowchart shown in FIG. 13 shows processing performed by the object recognition unit 12 in the processing performed by the control unit 10 of the display apparatus 2.

First, the object recognition unit 12 receives image data from the image data acquisition unit 11 (Step S11). When the object recognition unit 12 receives the image data, it recognizes a target object by referring to the feature value dictionary, and determines whether or not the target object is in the image data (Step S12). If the object recognition unit 12 cannot recognize the target object in the image data (No in Step S12), the process returns to Step S11, where the object recognition unit 12 acquires the next image. On the other hand, if the object recognition unit 12 recognizes the target object in the image data (Yes in Step S12), the warning determination unit 121 of the object recognition unit 12 determines whether or not the recognized object is an object to be warned (Step S13).

An example of a method for determining whether or not the recognized object is an object to be warned is given below. The object recognition unit 12 sequentially receives image data shot by the camera 901 via the image data acquisition unit 11, and sequentially performs processing for recognizing an object on the received image data. Therefore, the object recognition unit 12 can estimate a moving direction and a moving speed of the object from the image data pieces acquired at a plurality of times different from each other. Further, the object recognition unit 12 can estimate that the recognized object is approaching the automobile 900 and estimate that the approaching object may come into contact with the automobile 900 based on a preset threshold value. Therefore, when the approaching object may come into contact with the automobile 900, the object recognition unit 12 determines the recognized object to be an object to be warned. Further, an object traveling in the vicinity of the automobile 900 may be determined to be an object to be warned based on the position and the moving direction of the recognized object.

Note that when the automobile 900 includes a distance measuring sensor such as Light Detection and Ranging (LiDAR), the display apparatus 2 may acquire a signal from the distance measuring sensor in addition to the image data to be acquired from the camera 901 and estimate that the automobile 900 may come into contact with the object by using the acquired signal. Further, when the camera 901 is a stereo camera, it may be estimated that the automobile 900 may come into contact with the object based on a plurality of image data pieces acquired from the cameras 901 at the same time.

If the warning determination unit 121 does not determine that the recognized object may come into contact with the automobile 900 (No in Step S13), it does not determine to display a warning, and the process proceeds to Step S15. On the other hand, if the warning determination unit 121 determines that the recognized object may come into contact with the automobile 900 (Yes in Step S13), it determines to display a warning (Step S14). In this case, the warning determination unit 121 supplies information about the object for which a warning is to be displayed to the image processing unit 13. Further, the processing performed in Step S13 may be processing for determining whether or not the object recognized in Step S12 is an object to be warned. For example, even if there is no possibility of the recognized object coming into contact with the automobile 900, the recognized object may be determined to be an object to be warned when it is traveling in the vicinity of the automobile 900.

In Step S14, if the warning determination unit 121 determines to display a warning, the image processing unit 13 performs predetermined processing for displaying a warning on the image data of the object for which a warning is to be displayed. Note that a specific example of this predetermined processing will be described later.

After Step S14, the object recognition unit 12 determines whether or not all of the processing is completed (Step S15). If the object recognition unit 12 does not determine that all of the processing is completed (No in Step S15), the process returns to Step S11, where the object recognition unit 12 acquires image data again. On the other hand, if the object recognition unit 12 determines that all of the processing is completed (Yes in Step S15), it ends the processing.

Figure 14:
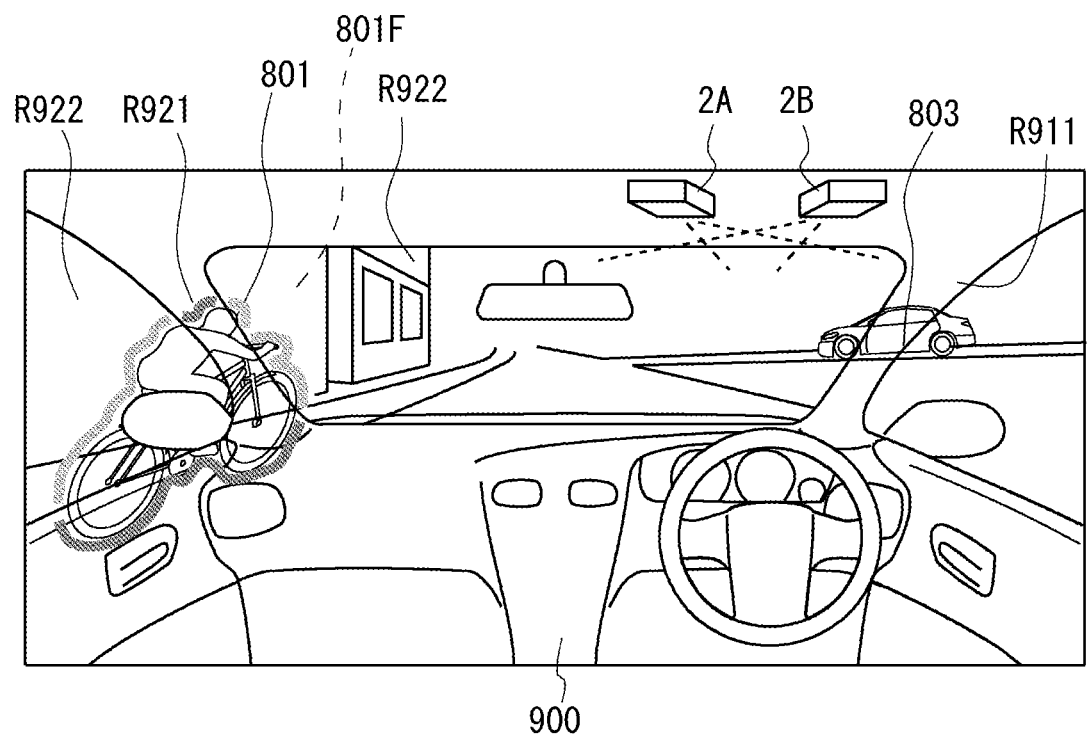
FIG. 14 shows an example in which an image is projected by the display apparatus according to the second embodiment.

Next, a specific example in which a warning is displayed will be described with reference to FIG. 14. FIG. 14 shows an example in which an image is projected by the display apparatus according to the second embodiment. As shown in FIG. 14, display apparatuses 2A and 2B are disposed in the cabin of the automobile 900. The display apparatus 2A is configured to project an image toward the right front of the cabin. Further, the display apparatus 2B is configured to project an image toward the left front of the cabin. Further, in FIG. 14, the bicycle 801 traveling to the left front of the automobile 900 is in a situation in which the bicycle 801 is traveling in the vicinity of the automobile 900 or in which it may come into contact with the automobile 900. Further, although the other automobile 803 is in the right front of the automobile 900, the possibility of it coming into contact with the automobile 900 is low at the point of time when this image is displayed, that is, the other automobile 803 is not an object to be warned.

In such a situation, the display apparatus 2A displays an image of the other automobile 803 shot by the camera 901. Here, the display apparatus 2A determines that the other automobile 803 is not the object to be warned. Therefore, the display apparatus 2A displays the other automobile 803 without displaying a warning. Meanwhile, the display apparatus 2B displays an image of the bicycle 801 shot by the camera 901 while displaying a warning. Displaying a warning is to display a line image obtained by extracting the contour of the object to be warned.

The warning determination unit 121 of the display apparatus 2B determines, from the image data acquired from the camera 901, that the bicycle 801 is the object to be warned. Therefore, the warning determination unit 121 supplies, to the image processing unit 13, information about the display of a warning. The image processing unit 13 generates, based on the information received from the warning determination unit 121, a line image obtained by extracting the contour of the bicycle 801, and superimposes the generated line image on the bicycle 801 and displays it. By performing such display, it is possible for the driver to intuitively recognize the presence of an object or the like which may come into contact with his/her automobile.

The second embodiment has been described above. However, a method for displaying a warning is not limited to the above-described method, and various methods for displaying a warning can be employed. For example, a warning may be displayed by blinking the display of the above-described line image obtained by extracting the contour of the object or changing the thickness of the line. Further, a warning may be displayed by changing a display mode in accordance with the moving speed of the object to be warned. Further, the warning determination unit 121 may determine a degree of risk to the automobile 900 in a plurality of stages, and change the display mode in accordance with the degrees of risk determined in the plurality of stages. Further, the display apparatus 2 may be configured to generate, when it displays a warning, a sound from a speaker in response to the warning.

As described above, according to the second embodiment, it is possible to provide a display apparatus capable of suitably displaying information within the viewing angle of the driver or the like based on region distribution information.

Third Embodiment

Figure 15:
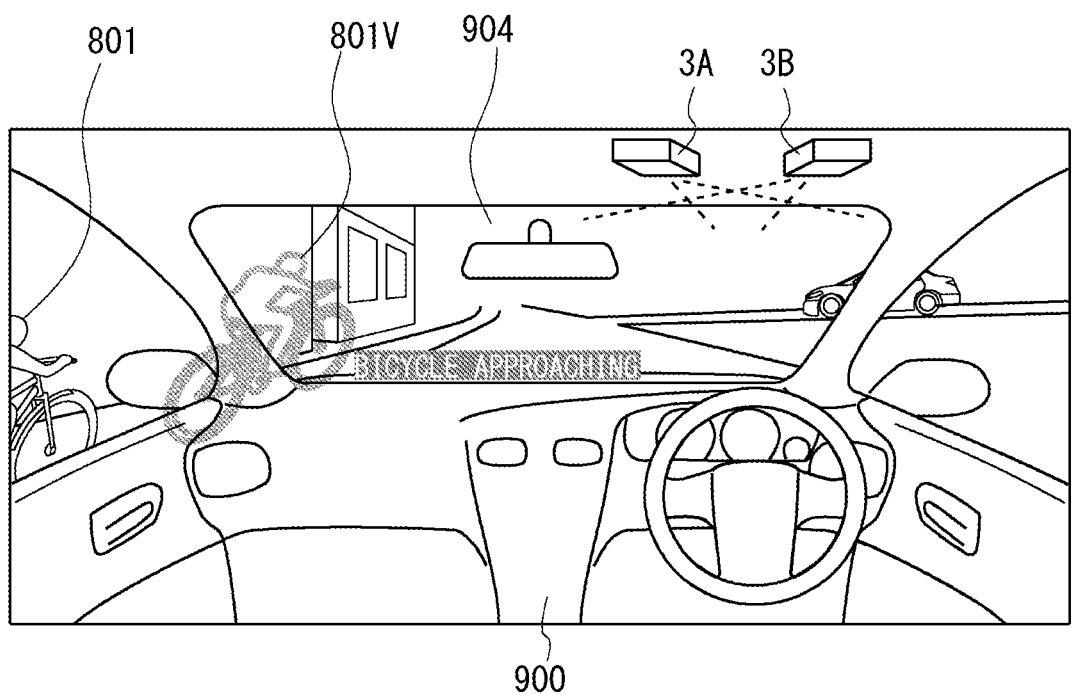
FIG. 15 shows an example in which an image is projected by a display apparatus according to a third embodiment.

Next, a third embodiment will be described with reference to FIG. 15. A display apparatus according to the third embodiment differs from the display apparatus according to the second embodiment in that an image to be projected onto the target projection region is generated based on region distribution information and then the generated image is displayed. FIG. 15 shows an example in which an image is projected by the display apparatus according to the third embodiment.

As shown in FIG. 15, display apparatuses 3A and 3B are disposed in the cabin of the automobile 900. The display apparatus 3A is configured to project an image toward the right front of the cabin. Further, the display apparatus 3B is configured to project an image toward the left front of the cabin. Further, in FIG. 15, the bicycle 801 traveling on the left side of the automobile 900 is in a situation in which it is traveling at a position such as a blind spot where it is difficult for the driver of the automobile 900 to check visually or through a mirror.

In such a situation, the display apparatus 3B displays a pseudo bicycle 801V in the region where the bicycle 801 is to travel based on the image of the bicycle 801 shot by the camera. The bicycle 801V is an image displayed at a position where the bicycle 801 is assumed to be located when a predetermined period of time has elapsed.

The display apparatus 3B generates image data of the bicycle 801V in a predetermined region based on image data of the bicycle 801 generated by the camera 901. An example of a method performed by the display apparatus 3B for generating image data of the bicycle 801V is given below. First, the image processing unit 13 of the display apparatus 3B performs a linear transformation on the image data of the bicycle 801 and moves it to a predetermined region. Then, the image processing unit 13 checks whether each pixel of the moved image data corresponds to the first region or the second region. Further, the image processing unit 13 selects a predetermined color from among R, G and B for the pixel corresponding to the first region, and sets the output value so that the image is displayed by the selected color. Then, the image processing unit 13 sets the output value of the UV of the pixel included in the first region to zero. Similarly, the image processing unit 13 selects UV for the pixel corresponding to the second region, and sets the output value so that the image is displayed by ultraviolet light. Then, the image processing unit 13 sets the output value of each of R, G and B of the pixel included in the second region to zero.

Further, as shown in FIG. 15, the display apparatus 3B may display, in addition to the display of the pseudo bicycle 801V, character information for making the driver recognize the risk, the position, and the like of the bicycle 801 on the windshield 904. For example, the display apparatus 3B may display character information indicating that the traveling bicycle is in the blind spot.

As described above, the display apparatus according to the third embodiment can display a pseudo object regardless of whether the target projection region is the first region or the second region. Thus, it is possible to perform display so that the driver can intuitively recognize the display.

Any processing of the above-described display apparatuses can also be implemented by causing a Central Processing Unit (CPU) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, in addition to the cases where the functions of the aforementioned embodiments are implemented by causing a compute to execute a program that is used to implement functions of the aforementioned embodiments, other cases where the functions of the aforementioned embodiments are implemented with cooperation with an Operating System (OS) or application software running on the computer are also included in the embodiments of the present disclosure. Further, other cases where all or part of the processing of this program is executed by a function enhancement board inserted into the computer or a function enhancement unit connected to the compute to implement the functions of the aforementioned embodiments are also included in the embodiments of the present disclosure.

Note that the present disclosure is not limited to the above-described embodiments and may be modified as appropriate without departing from the spirit of the present disclosure. For example, the above-described display apparatus can be applied not only to an automobile but also to a mobile body such as a train, an aircraft, and a ship.

What is claimed is:

1. A display apparatus configured to project an image of an object located in an area outside a mobile body onto a target projection surface, the target projection surface being set in a cabin of the mobile body and having a first region in which a first wavelength light is reflected and a second region in which the first wavelength light is transmitted and in which visible light is emitted by receiving a second wavelength light that is different from the first wavelength light, the display apparatus comprising:

an image data acquisition unit configured to acquire image data which is data of the image;

an image processing unit configured to, based on region distribution information which is information about a distribution of the first and the second regions, generate projection image data by performing, on the image data, image conversion processing including color conversion in which the first wavelength light is selected for a pixel corresponding to the first region and the second wavelength light is selected for a pixel corresponding to the second region;

a light source unit configured to emit light selected from either the first wavelength light or the second wavelength light; and a projection unit configured to project the image formed by the emitted light onto the target projection surface.

2. The display apparatus according to claim 1, further comprising an object recognition unit configured to recognize, from the image data, a target object which is a predetermined target to be recognized, wherein the image processing unit extracts image data of the recognized target object and generates the projection image data of the extracted image data.

3. The display apparatus according to claim 2, wherein when the target object is included in a projection image to be projected onto the second region, the image processing unit generates line image data for surrounding an area around the target object by a polygon.

4. The display apparatus according to claim 2, wherein the object recognition unit determines whether or not there is a possibility of the target object coming into contact with the mobile body, and the image processing unit generates the line image data including a contour of the target object based on a result of the determination.

5. The display apparatus according to claim 2, wherein the object recognition unit determines whether or not there is a possibility of the target object coming into contact with the mobile body, and the image processing unit generates, in a region where the target object is to move, the projection image data of the target object based on the result of the determination.

6. The display apparatus according to claim 1, wherein the mobile body is an automobile, and the first region includes at least one of a front pillar, a door trim, and a dashboard.

7. The display apparatus according to claim 1, wherein the image processing unit generates the projection image data as an image viewed from a viewpoint of a passenger riding in the mobile body.

8. A display method for projecting an image of an object located in an area outside a mobile body onto a target projection surface, the target projection surface being set in a cabin of the mobile body and having a first region in which a first wavelength light is reflected and a second region in which the first wavelength light is transmitted and in which visible light is emitted by receiving a second wavelength light that is different from the first wavelength light, the display method comprising:

an image data acquisition step of acquiring image data which is data of the image;

an image conversion step of, based on region distribution information which is information about a distribution of the first and the second regions, generating projection image data by performing, on the image data, image conversion processing including color conversion in which the first wavelength light is selected for a pixel corresponding to the first region and the second wavelength light is selected for a pixel corresponding to the second region;

an emission step of emitting light selected from either the first wavelength light or the second wavelength light; and a projection step of projecting the image formed by the emitted light onto the target projection surface.

9. A non-transitory computer readable medium storing a control program for causing a computer to execute the method according to claim 8.

* * * * *